Nov. 28, 1939.  J. H. KIRBY, 2D  2,181,512
SAMPLE TAKING DEVICE
Filed Jan. 18, 1937  3 Sheets-Sheet 1

JOHN H. KIRBY II
INVENTOR
BY Jesse R. Stone
Lester D. Clark
ATTORNEYS

Nov. 28, 1939.    J. H. KIRBY, 2D    2,181,512
SAMPLE TAKING DEVICE
Filed Jan. 18, 1937    3 Sheets-Sheet 3

JOHN H. KIRBY II
INVENTOR
BY Jesse R. Stone
Lester D. Clark
ATTORNEYS

Patented Nov. 28, 1939

2,181,512

UNITED STATES PATENT OFFICE 2,181,512

SAMPLE TAKING DEVICE

John H. Kirby, 2d, Houston, Tex.

Application January 18, 1937, Serial No. 121,121

7 Claims. (Cl. 255—1)

The invention relates to well drilling equipment and pertains more particularly to a device for taking of accurate geological samples from any desired stratum that has been penetrated during drilling.

It has become common practice in the rotary drilling of oil wells to take core samples from the strata penetrated. Accurate knowledge of geological strata obtained in this manner often enables the driller to proceed in the most efficient manner and, if a liberal drilling program has been pursued in the area in which core taking is practiced, the driller is apprised of the nature of the strata to be expected. Furthermore, the geologist is informed of the trend of strata and is thus given an indication of the most promising locations for further drilling. The most accurate knowledge of subsurface conditions naturally accrues when the samples taken for analysis are accurate samples from the strata from which they are taken.

It is an object of this invention to provide a device that will obtain accurate samples from bore holes whereby the advantages to be realized from accurate sample taking are obtained.

Another general object is to provide a device that will obtain samples from the walls of a bore hole whereby samples may be taken at any level and at any time.

It is also an object to take cores within a well bore in such a manner that when the cores are brought to the surface the component parts thereof will be in the same relative position as when in the original formation.

Another object is to provide a self-contained core taking device that may be set in operation from the earth's surface when the device is positioned at a predetermined point in the well bore.

A further object is to provide an encased core taking device in which the coring bit is automatically advanced from the encased housing into the wall of a well bore and is thereafter retracted within the housing for return to the earth's surface.

Still another object is to provide an automatically operated core taking device that may be self-contained or may be supplied with electrical energy through conductors from the earth surface when the device is in core taking position within the well.

Other and lesser objects, together with the foregoing, will be apparent from the following description of the novel features of the construction, operation and arrangement of parts, of which an example is presented in this specification and illustrated in the accompanying drawings, in which.

Figure 1:
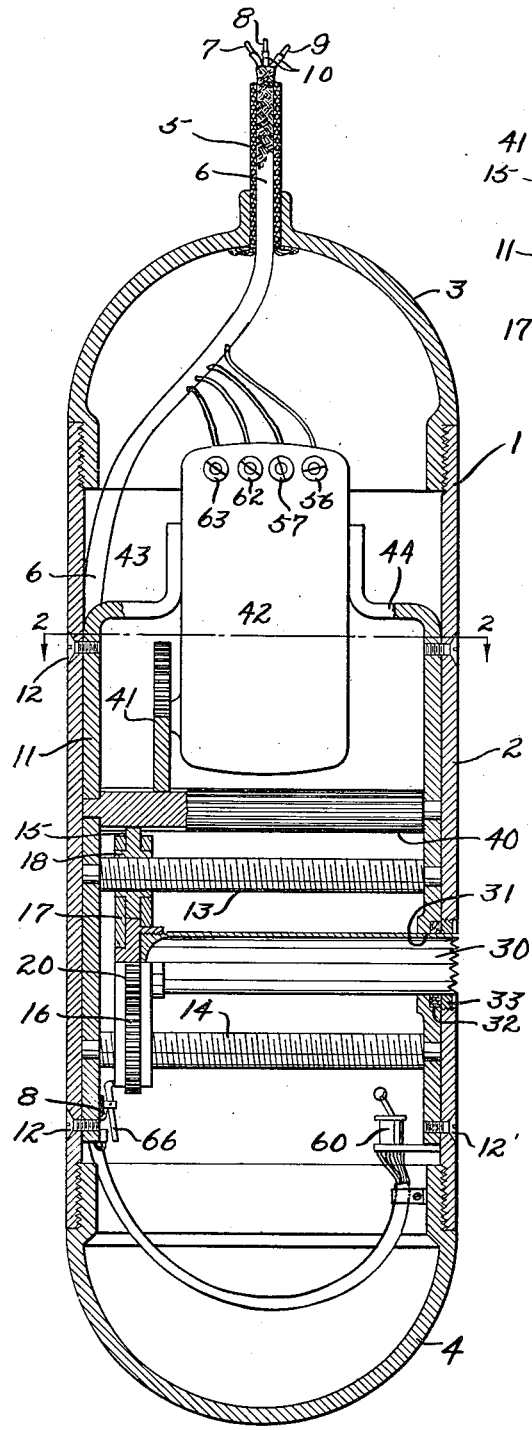
Fig. 1 is a longitudinal sectional view showing an arrangement of parts in a device made in accordance with the preferred embodiment of the invention.
Figure 2:
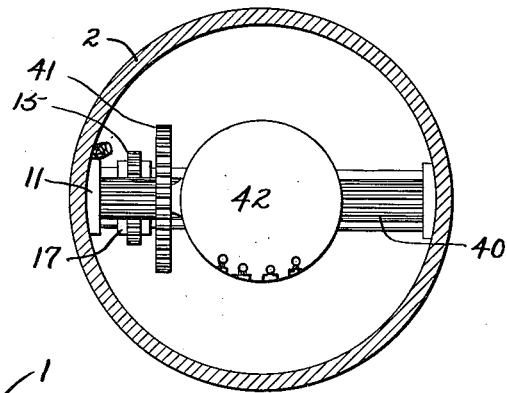
Fig. 2 is a sectional view taken on line 2—2 of Fig. 1.

The device of the invention comprises essentially a housing 1 which may be lowered into a well bore to a level at which it is desired to obtain core samples. Within this housing is a core taking bit, together with means for rotating and advancing the same outwardly into the wall of the well bore.

Housing 1 comprises a cylindrical section 2, the ends of which are sealed by caps 3 and 4. A cable 5 is centrally attached to cap 3 in any suitable manner, and is adapted to cooperate with suitable hoisting means (not shown) for positioning the device in the bore hole. In the preferred form of the invention cable 5 is hollow and surrounds an electric cable 6 comprising a plurality of conductors 7, 8 and 9, each of which is provided with insulation 10. A framework, generally designated as 11, is positioned within the housing 1, and is attached thereto as by screws 12. Threaded pillars 13 and 14 (Fig. 1) are provided within frame 11 transversely of housing 1. Gears 15 and 16 are provided with complementary threads and are rotatably mounted upon pillars 13 and 14. A guiding yoke 17 is mounted upon hub extensions 18 on gears 15 and 16, and rotatably supports an intermediate gear 20 to form a gear train assembly that will move longitudinally of the pillars if driving effort be imparted to any one of the gears. The purpose of this gear train assembly is to provide rotational and advancing movement to a core taking bit 30 rigidly attached to driven gear 20, and extending through an opening 31 in frame 11 and housing 1. Since the device will in normal use be frequently surrounded by liquid under pressure, such as drilling fluid or oil, it is desirable to seal housing 1 from the entry of fluid thereto. To prevent such fluid from entering about coring bit 30 a stuffing box is provided in opening 31, and packing 32 is held in sealing relation with the bit by threaded gland ring 33.

An elongated pinion 40 is rotatably mounted in frame 11 in meshing relation with gear 15 and is driven through the drive gear 41 on motor 42. This motor is suitably mounted upon the inwardly extending arms 43, 44 of frame 11. It is apparent from the foregoing description that when the motor 42 is driven from any suitable source of energy pinion 40 will drive the gear train 15, 20 and 16 and that the gear train assembly and bit 30 will move along pillars 13 and 14 in a direction depending upon the direction of rotation of the armature of the motor 42.

Figure 3:
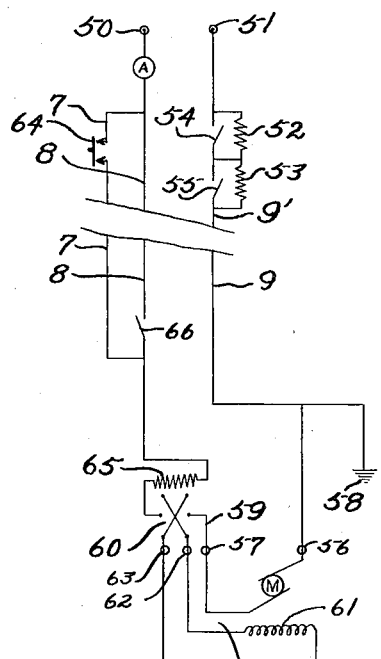
Fig. 3 is a diagrammatic representation of a circuit that may be used when driving energy is conducted through insulating wires from an energy source at the mouth of the bore hole.

In the embodiment shown in Fig. 1 a suitable wiring arrangement is that illustrated in Fig. 3 in which the portion shown above the break represents that portion of the electrical circuit that is provided at the mouth of the bore hole. The portion shown below the break represents the interior wiring of the device of Fig. 1.

Energy from a suitable source is supplied to terminals 50 and 51 of the electric circuit. Wire 9' leads from terminal 51 through control resistors 52 and 53 to wire 9 at the coring device. Shunting switches 54 and 55 are arranged to selectively short circuit these resistors 52 and 53 whereby the voltage that will be applied to the drive unit is controlled. Wire 9 is connected to armature terminal 56 of the motor 42 and is also connected to ground 58. The opposite terminal 57 of the motor armature is connected through wire 59 to a double-pole, double-throw reversing switch 60 whereby current in the field 61, which is connected to terminals 62 and 63, may be reversed to reverse the direction of rotation of the motor armature. The switch 60 is thrown to reverse the direction of rotation and withdraw the drill 30 by contact of yoke 17 with the arm of said switch as the cutting of the core is finished.

Switch 60 is illustrated as being of the over-load reversing type, an over-load reversing coil 65 being provided in line wire 8. This over-load coil and switch 60 may be self-contained, as is well known in the art.

A stop-switch 66 in conductor 8 is opened when the coring bit is retracted and serves to open the support and stop motor 42 when the core taking operation is completed.

A practical mode of wiring the device is shown in Fig. 1 wherein cable 6 carries the wires 7, 8 and 9 into the coring device within which necessary wires are incorporated in the cable to provide the desired connections with motor 42, reversing switch 60, and stop-switch 66. As the exact mode of wiring is in the province of one skilled in the art, further description thereof is not necessary.

Figure 4:
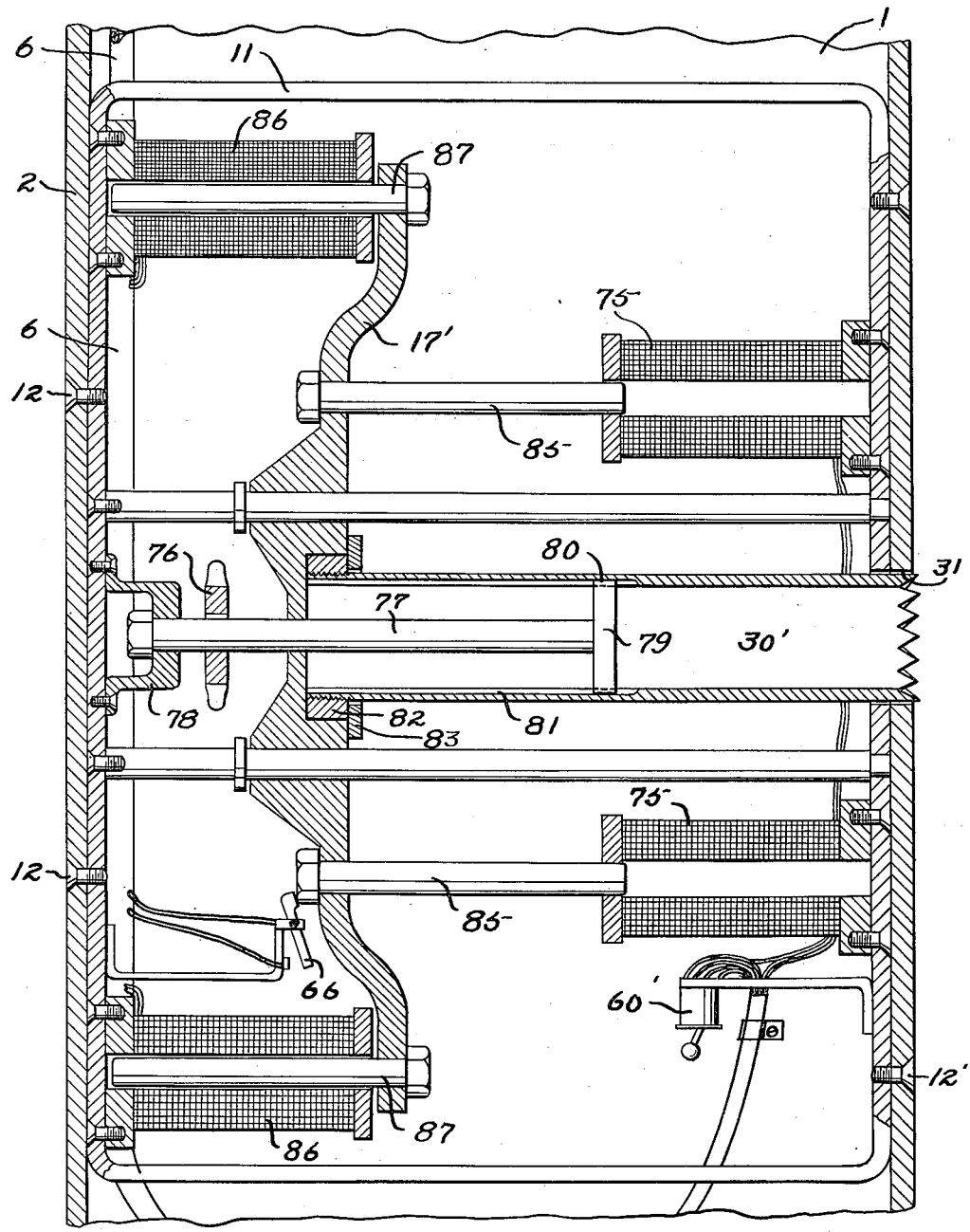
Fig. 4 is a sectional view of a portion of the device showing a modification in which electromagnetic core bit advancing and retracting means is utilized.

In the modification shown in Fig. 4, means for advancing and retracting the core taking bit 30' is electro-magnetic. Solenoids 75 are energized when the circuit is closed to advance bit 30' into the walls of the well bore. The driving motor which is not shown in Fig. 4 may be connected to core bit 30' as by chain driving sprocket 76 fixed to spindle 77, rotatably mounted in brackets 78 and extending through yoke 17'. A drive disc 79 is fixed to the end of spindle 77 and is provided with projections 80 to engage longitudinal slots 81 on the inner surface of core bit 30', which is rotatably held in yoke 17' by a flange 82 and a retaining collar 83. It is thus apparent that by this construction core bit 30' may be rotated by driving sprocket 76 and that the bit may be advanced by the magnetic pull of solenoids 75 upon plungers 85 attached to yoke 17'. When the outward movement of the core bit is completed switch 60' is actuated to open a circuit through solenoids 75 and close the circuit through solenoids 86, whereupon plungers 87 are drawn into solenoids 86 and the core bit is withdrawn from the wall of the well bore until operation of the device is terminated by the opening of switch 66 from contact with the head of the plunger 85. The completion of this operation is apparent from an observation of the indication on ammeter A in line 8 at the earth's surface.

Attention is directed to the fact that in each of the modifications described reversing switches 60 and 60' are left in the position for effecting withdrawal of the core bit after core taking has been completed. This construction prevents a core retake operation until the device has been withdrawn and the switch reset by removing screw 12' to permit access to a reset tool. Attention is also directed to the fact that switch 66 remains open until the coring device has advanced sufficiently to permit closure thereof. In order to close this switch after reversing switch 60 has been reset a push button switch 64 is provided to shunt switch 66 through wire 7, thereby permitting closure of the circuit until switch 66 is permitted to close the circuit for the remainder of the cycle of operation.

Figure 5:
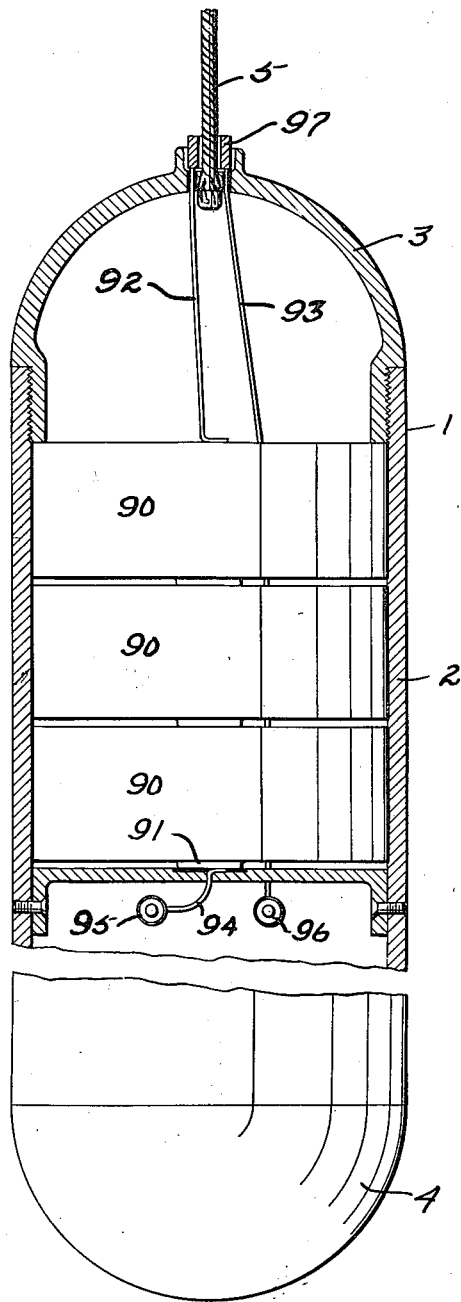
Fig. 5 is a sectional view of a modified form in which the energy source and coring unit are self-contained within a single enclosed chamber.

By using an embodiment as disclosed in Fig. 5 the use of current carrying conductors from the earth's surface is eliminated by making the unit self-contained. In this embodiment a battery comprising a plurality of cells 90 is used for a source of energy for driving the motor and co-operating core taking mechanism. These cells are shown as interconnected in a form that is well known in construction of portable flash lights. Terminal 91 of this battery is connected to the circuit of the driving mechanism through a wire 94 and a terminal connector 95. The other terminal of the battery is connected to a wire 92 which extends through cap member 3 and is insulated therefrom. A second wire 93 also extends through the cap member 3 and is insulated therefrom and is connected through terminal 96 to the circuit of the core taking mechanism.

When the above described embodiment of the invention is used the device is lowered by means of cable 5 to the desired point within the well bore. A contactor ferrule 97 surrounding cable 5 is then released and is permitted to move downwardly by gravity and contact the ends of wires 92 and 93, thus closing a circuit through the core taking mechanism whereby the complete cycle of operation previously described is carried out. It is apparent that the described mechanism for closing the circuit in this embodiment is illustrative and may be modified in any manner to accomplish the desired closure of the electric circuit as is well known in the art.

The invention has the advantage of being operated quickly and economically. The device may be lowered at the end of the operating cable 5 with the consumption of but little time. It may be employed at any desired level to take a sample from the wall of the well and then again rapidly withdrawn to the surface. It is obvious, of course, that more than one core taking unit may be housed within the casing 2 to take a plurality of samples simultaneously and I wish it understood that such operation is contemplated.

While the foregoing description presents a preferred embodiment of the invention and certain modifications thereof, the invention is not confined to the specific details described. Numerous changes and modifications may be made both in general appearance and arrangement of elements, and such changes and modifications are intended to come within the scope of the appended claims.

What is claimed is:

1. A device for cutting core samples from the wall of a well bore including a housing, a coring bit transversely of said housing, a threaded pillar adjacent said coring bit, a driving gear threadably mounted upon said pillar, a guiding yoke mounted upon said driving gear, a pinion in said yoke, meshing with said gear and fixed to said bit, and means for rotating said driving gear whereby said bit may be simultaneously rotated and advanced.

2. A sample taking device including, a housing having an opening in the wall thereof, a core taking bit positioned in said housing to operate through said opening, a threaded shaft parallel with said bit, a gear mounted to screw along said shaft, a yoke movable along said shaft by said gear, a pinion on said bit rotatable by said gear, said pinion and said bit being movable transversely of said housing by said yoke, means to rotate said gear, and means operable by contact with said yoke to reverse the direction of rotation of said gear.

3. A sample taking device including, means for rotatably supporting a coring bit transversely of a bore hole, a threaded shaft parallel with said bit, a gear threaded on said shaft and operatively connected with said bit to rotate said bit about its longitudinal axis, means to rotate said gear, means connected with said gear for advancing said bit into the wall of the bore hole to cut a sample therefrom and for retracting said bit after the sample is cut, and means operative automatically when said bit is completely withdrawn for rendering said first mentioned means inoperative.

4. A device for cutting core samples from the wall of a well bore including, a housing, a coring bit transversely of said housing, a threaded pillar adjacent said coring bit, a driving gear threadably mounted upon said pillar, a guiding yoke mounted upon said driving gear, a pinion in said yoke, meshing with said gear and fixed to said bit, means for rotating said driving gear, whereby said bit may be simultaneously rotated and advanced, means operable by the advance of said coring bit for reversing the direction of movement of said bit when a predetermined length of core is cut, and means for preventing the rotation of said driving gear to rotate and advance said bit when the reversing means is improperly set.

5. A sample taking device including, a housing having an opening in the wall thereof, a core taking bit positioned in said housing to operate through said opening, a threaded shaft parallel with said bit, a gear mounted to screw along said shaft, a yoke movable along said shaft by said gear, a pinion on said bit rotatable by said gear, said pinion and said bit being movable transversely of said housing by said yoke, means to rotate said gear, means operable by contact with said yoke to reverse the direction of rotation of said gear, and means for preventing the rotation of said gear when the reversing means is improperly set.

6. A device for cutting core samples from the wall of a well bore including, a housing, a coring bit transversely of said housing, a threaded pillar adjacent said coring bit, a driving gear threadably mounted upon said pillar, a guiding yoke mounted upon said driving gear, a pinion in said yoke, meshing with said gear and fixed to said bit, means for rotating said driving gear, whereby said bit may be simultaneously rotated and advanced, and means operable by the advance of said coring bit for reversing the direction of movement of said bit when a predetermined length of core is cut.

7. A sample taking device including, means for rotatably supporting a coring bit transversely of a bore hole, a threaded shaft parallel with said bit, a gear threaded on said shaft and operatively connected with said bit to rotate said bit about its longitudinal axis, means to rotate said gear for advancing said bit into the wall of the bore hole to cut a sample therefrom and for retracting said bit after the sample is cut, means operative automatically when said bit is completely withdrawn for rendering said first mentioned means inoperative, and means for preventing the advancement of said bit to cut a sample when said withdrawing means is improperly set.

JOHN H. KIRBY, II.